July 21, 1931.  A. A. WIEDMAIER  1,815,688
TRANSMISSION
Filed May 13, 1929  2 Sheets-Sheet 1

Inventor
Arthur A. Wiedmaier
By Frank M. Slough
His Attorney

July 21, 1931.  A. A. WIEDMAIER  1,815,688
TRANSMISSION
Filed May 13, 1929   2 Sheets-Sheet 2

INVENTOR
Arthur A. Wiedmaier
BY
Frank M. Slough
His ATTORNEY.

Patented July 21, 1931

1,815,688

UNITED STATES PATENT OFFICE

ARTHUR A. WIEDMAIER, OF CLEVELAND, OHIO, ASSIGNOR TO THE WIEDMAIER COMPANY, OF CLEVELAND HEIGHTS, OHIO, A CORPORATION OF OHIO

TRANSMISSION

Application filed May 13, 1929. Serial No. 362,775.

My invention relates to transmissions and relates particularly to transmissions comprising an arrangement of gearing adapted to be disposed within the rear axle of an automobile.

An object of my invention is to provide what is commonly known in the trade as an "overdrive" mechanism, adapted to be disposed within the rear axle of an automobile for the purpose of effecting a change of gearing ratios between the driving and driven elements of the rear axle.

Another object of my invention is to provide an improved variable speed gearing for automobile rear axles.

Another object of my invention is to provide an improved variable speed gearing for automobile rear axles, which is adapted to be inserted as optional equipment within a standard rear axle housing to supply an added ability to drive the rear wheels of the vehicle at a higher rate of speed relative to the rate of rotation of the propeller shaft effecting the transmission or rotary motion from the engine to the rear axle.

Other objects of my invention and the invention itself will become apparent by reference to the following description of an embodiment of my invention, and in which description reference will be had to the drawings illustrating the said embodiment.

Referring to the drawings.

Figure 1:
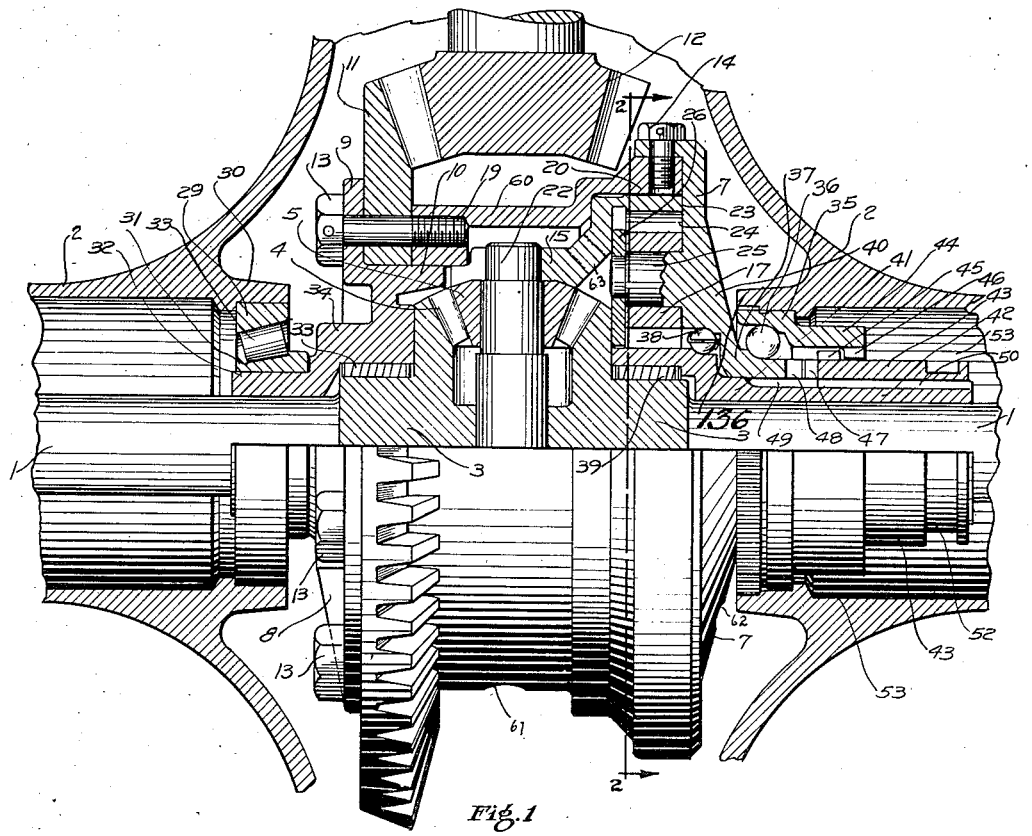
Fig. 1 illustrates an embodiment of my invention in horizontal medial sectional view, certain parts being illustrated in plan view.

Referring now to all of the figures of drawings in which like parts are designated by like reference characters, the rear axles 1, which at their ends effect driving of a pair of vehicle wheels in the usual manner, are carried in suitable bearings at the rear end of the axle housing 2, extending inwardly therefrom to project within the centrally disposed enlarged portion of the housing, illustrated in Fig. 1, wherein they terminate in enlarged ends 3 supporting a bevelled gear 4 of a differential mechanism, comprising the pair of opposed gears 4 and a plurality of differential pinions, one of which, 5, is shown, the others being likewise disposed on other like arms 6 of a differential mechanism spider in the usual manner.

The differential mechanism comprising the gears 4 and pinions 5, together with their associated spider, and bearings, are carried within a shell or casing comprising an intermediate tubular casing element 60 and dissimilar flanged end plates 7 and 8.

In the embodiment illustrated, the end plate 8 supports by its flanges 9 and 10, the ring gear 11, to which rotary driving movement is communicated by the driving pinion 12 in the usual manner.

A series of bolts 13 project through the flange 9 and the base of the ring gear 11, into a shanked end of the intermediate casing tube 60, rigidly securing the ring gear between the casing tube and the radial flange 9.

A series of bolts 14 projected through the peripheral flange of the end plate 7, into the opposite shanked end of the intermediate differential casing tube 60, together with the bolts 13, effects juncture between the casing tube 60 and the end plates 7 and 8 to form the casing, and, moreover, to communicate rotary motion from the ring gear 11 to the differential casing; comprising the said intermediate tube 60 and end plates 7 and 8, telescoped within the casing tube 60.

In the usual type of differential mechanisms for automobile rear axles, the spider 6 is rotated on its axis, disposed axially of the axle shafts 1, by a direct driving connection had between the spider and the ring gear 11, usually through the differential casing, which rotates with the ring gear.

Figure 2:
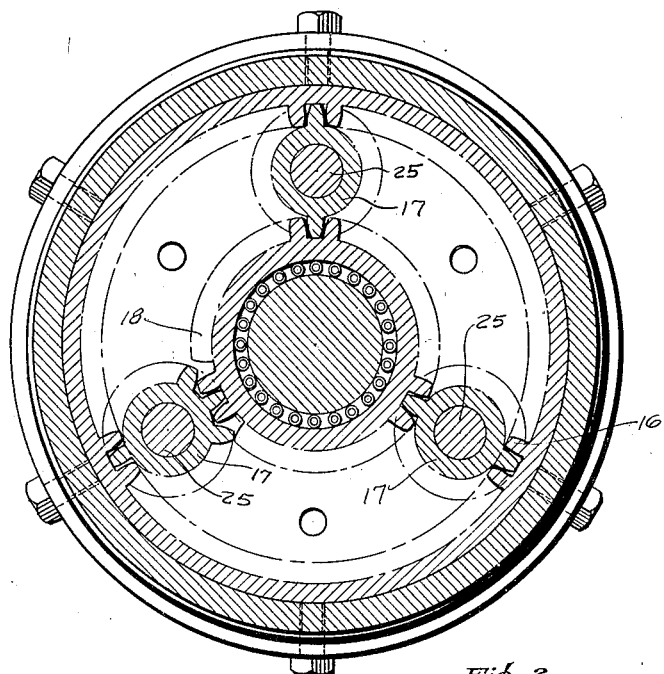
Fig. 2 is a section taken through a rear axle mechanism, as illustrated in Fig. 1, on a line 2—2 indicated in Fig. 1.
Figure 4:
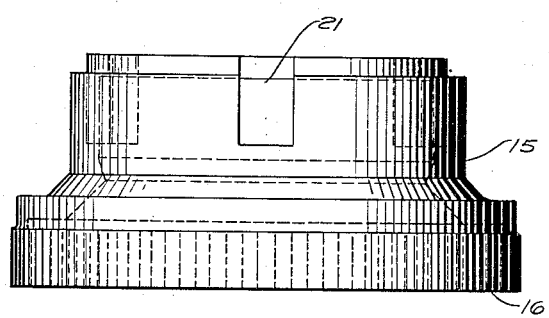
Fig. 4 is a rear elevational view of an annulus supporting a sun gear comprising a driving element of the mechanism of the said embodiment.

In the embodiment of my invention herein illustrated, driving of the spider 6 is effected by rotation of a tube 15, illustrated in Figs. 2 and 4, the inner surface of one of which is formed with gear teeth 16, to form an internal orbit gear of a planetary gearing mechanism, the planet gears of which are shown at 17, and the sun gear thereof at 18. The sun gear 18 is rotatably supported within the differential casing tube 60 with the shanked end portions of which it makes bearing contact, as shown at 19 and 20.

The tube 15 is enlarged at its end forming the orbit gear 16, and its relatively reduced opposite end is provided with a plurality of slots 21, herein illustrated as being four in number, extending from the end edge longitudinally of the tube, these slots being of sufficient width to snugly receive the reduced ends 22 of the spider arms 6 of the differential mechanism. Thrust bearing contact is had at 23 and 24 between the slotted tube and the differential casing to maintain the tube in correct longitudinal position.

The plate 7 is formed with a plurality of planet gear supporting stud shafts 25, which are integrally formed with the plate 7, and project from its inner surface.

Figure 3:
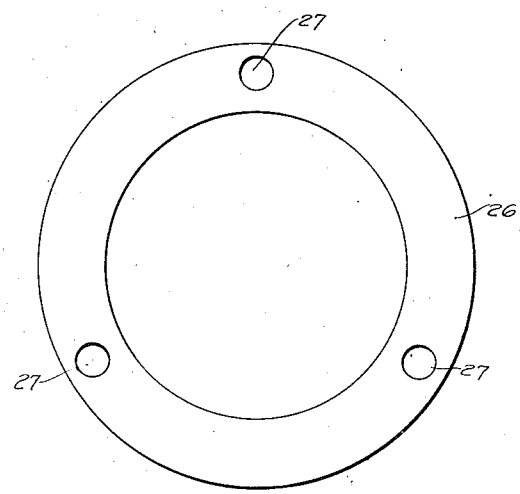
Fig. 3 is an end elevational view of a thrust plate employed in the said embodiment.
Figure 5:
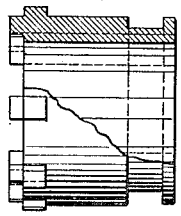
Fig. 5 is a view in elevation of a longitudinally movable jaw clutch element broken away to show the walls of the inner bore.

In the embodiment illustrated, three of such stud shafts 25 are provided, each rotatably supporting a planet gear 17. Any desired number could, however, be used. An annular thrust plate 26 is interposed between the inner ends of the planet gears 17 and adjacent outer surfaces of the tube 15 and adjacent gear 4, and as illustrated in Fig. 3, is provided with three apertures 27 adapted to snugly receive the reduced ends of the spaced stud shafts 25.

The annular thrust plate 26 makes bearing contact with an outer lateral surface of the orbit gear supporting tube 15 so that relative rotative movement between said tube and said plate may be effected, and whereby said tube and plate are maintained in proper relative positions.

A bearing ring 29 is tightly fitted within an annular flange 30 of the housing 2, and cooperates with an opposing bearing ring 31 disposed in telescoped relation thereto, being snugly fitted on to the outwardly extending hub 32 of the differential casing end plate 8 to receive a series of bearing rollers 33 engaging by bearing rolling contact, the bearing race surfaces of the two rings.

The hub 32 is also journalled on the axle shaft 1 telescoped therein, and a series of bearing rolls 33 are interposed between bearing race surfaces of an enlarged inner portion 34 of the hub and the enlarged end portion 3 of the said axle shaft, which carries the differential gear 4.

Similarly a tubular element 35 is tightly driven within the flange 136 of the housing and is provided with an inner bearing race surface engageable with a series of bearing balls 36 interposed between the said bearing race surface and an opposing race surface formed on the outer surface of the outwardly extending hub extension 37 of the end plate 7. The end plate 7, however, is not journalled directly on to the inner end of the axle shaft 1, which is telescoped within the plate, this being accomplished, however, through a series of bearing balls 38 and a series of bearing rollers 39 interposed respectively between an inner race surface formed on a shoulder 40 of the end plate 7, and an outer surface of a sleeve 41, for the balls 38; and an inner surface of the sleeve 41 and an outer surface of the enlarged portion 3 of the associated axle shaft 1, for the bearing rollers 39.

The sleeve 41 is formed with a long tubular sleeve portion 42 journalled on the associated axle shaft 1, and its inner end is enlarged, the inner surface of the enlarged inner end forming a bearing race for the rollers 39, the outer surface being in the form of a series of gear teeth to form the sun gear 18.

The planet gears 17 are therefore radially disposed relative to the sun gear and are continuously in mesh therewith, being in their outer radially disposed portions also enmeshed with the teeth of the orbit gear 16, forming a typical planetary gearing mechanism, and by virtue of the rigid junction formed between the plate 7 and the rotating differential casing tube 60 by the bolts 14, the planet gears 25 are continuously carried during driving of the ring gear 11, in a rotative path, concentric with the sun and orbit gears and intermediate and in mesh with said gears.

Figure 6:
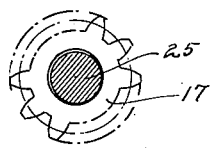
Fig. 6 is an elevational view of a modified planet gear mounting.

As illustrated in Fig. 6, I contemplate sometimes mounting the planet gears loosely on the stud shafts 25, this arrangement being particularly applicable where more than one planet gear, such as 17, is used, in order to prevent binding and unequal wear between the different planet gears.

A clutching mechanism is provided for the purpose of alternately clutching together the axle housing and the sun gear, or the sun gear and the planet gears, in order to effect different predetermined alternative gearing ratios between the ring gear 11 and the differential spider, which drives the rear axle shafts.

This clutching controlling mechanism comprises two pairs of alternately engageable jaw clutch elements. The first comprises clutch jaws 45 carried by a longitudinally slidable clutching sleeve 43 and clutch jaws 46 carried by a tubular extension 44 of the tube 35, which is rigidly carried by the axle housing 2, as above described. The second pair comprises jaws 47 carried by the slidable clutching sleeve 43 and jaws 48 formed on the outer end of the hub 37 of the plate 7. The jaws 45 and 46 extend inwardly and outwardly radially from their respective telescopable supports, whereas the jaws 47 and 48 extend longitudinally of their respective longitudinally aligned supports, and the jaws 45 and 47, carried by the shiftable sleeve 43 are disposed intermediate the jaws 46 and 48, whereby movement of the sleeve 43 in either longitudinal direction will effect alternate clutching between the alternately operable sets of jaws.

The sleeve 43 is journalled for longitudinal movement only on the outer surface of the sleeve 42 which, at its inner end, forms the said sun gear, and makes rotary bearing contact with the enclosed axle 1, there being a longitudinally extending key 50 projecting inwardly from the sleeve 43 in a longitudinally extending slot 49 in the sleeve 41, the key preventing relative rotative movement of the sleeve 41 carrying the sun gear and the shiftable clutch sleeve 43.

An annular groove 52 is provided at the outer end of the shiftable clutch sleeve 43 and is adapted to be engaged by forks of an operator controlled bifurcated controlling lever which is not shown but which may be of any form or type well known in the art as applicable for shifting a clutch of the type having the annular groove 52.

The said lever will preferably be joined by suitable linkage with a suitable manual control element at the driver's station of the automobile, any suitable linkage being employed for the purpose, the specific nature of the linkage not being a part of this invention. Any desired form of detent means may be employed to hold the lever in either of its two jaw clutching operative positions.

The mechanism of the embodiment of my invention illustrated is operated as follows: under conditions of driving effected by rotation of the driving pinion 12 communicated by the propeller shaft of the automobile not shown, to rotate the ring gear 11, which carries with it the differential housing, comprising end plates 7 and 8, and connecting casing tube 60 rigidly secured thereto.

Assuming that the clutching sleeve 43 is moved outwardly, that is to the right, as shown in Fig. 1, to effect clutching engagement between the jaws 45 of the sleeve and the jaws 46 of the annulus 35, affixed to the axle housing, rotation of the end plate 7 will cause revolutionary movement of the planet gears 17.

By virtue of the clutch relation, the sun gear 18 is held in non-rotatable position, since the clutched sleeve 43 is keyed directly on to the end tubular hub extension 42 of the sun gear supporting sleeve 41. The travel of the planet pinions 17 in meshed relation to the planet gear teeth will effect a rotary movement of each of these pinions on their stud shafts 25.

Rotary movement of the pinions 17 will effect driving of the orbit gear and thereby effect a rotation of the differential spider, which is disposed in direct driving relation to the orbit gear by virtue of the tubular extension 15 of the orbit gear, into slots 21 of which the ends 22 of the spider arms 6 are projected. Differential driving of the two axle shafts 1 is thence effected by the rotary movement of the differential spider in the usual manner.

Now assuming that the clutching sleeve is moved to its alternate opposite position wherein it prevents relative rotary movement of the clutching sleeve 43, and the plate 7. Rotary movement of the plate 7 will therefore cause the shiftable clutch sleeve 43 to be rotated and the key 50 will cause this rotary movement to be communicated to the sun gear 18, through its elongated tubular hub extension 42. The sun gear will, therefore, be rotated at the same rate at which the planet gears are revolved around the axis of the sun gear; that is there will be no relative rotative movement of the sun and planet gears, the planet gears in such case being moved in a rotative path, and having their teeth meshed with the teeth of the orbit gear 16, the orbit gear being driven also at the same rate of rotation as the rotative rate of the sun gear.

The effect of this second, or alternative, method of driving, will be to effect a rotary movement of the differential spider at the same rate of rotation as that imparted to the ring gear 11 and differential casing supporting the ring gear.

In this case, the rate of rotation of the differential spider will correspond to that of the differential ring gear, as in the usual method of driving.

It will be understood that the planet and orbit gears may, as illustrated, be disposed radially of the sun gear, or, as for instance where beveled gears are employed, they may be disposed angularly according to their bevel relations, so long as the functional relationships therebetween and relative to the pinion and the differential gearing, are maintained.

In the method of operation first described, the rate of rotation of the spider will be increased over that of the ring gear. This will be made more apparent, as follows, since in the embodiment illustrated the orbit gear contains 40 teeth, each of the planet gears contain 10 teeth and the sun gear is formed with 20 teeth; also since in the first described clutch position, the sun gear is held non-rotatably and the planet gears are caused to travel over the periphery of the sun gear, this will effect rotation of the planet gears at a rate equal to the rate at which the ring gear 11 is driven multiplied by the number of teeth in the sun gear, and this product divided by the number of teeth in each of the orbit gears.

The rotary movement of the orbit gear communicated by the teeth of the rotating planet gears will be, therefore, equal to the rotational rate of the ring gear 11 plus the acceleration of movement given to the orbit gear because of the rotational movement imparted to the planet gears, and this, as we have seen, causes the orbit gears to rotate.

In the embodiment illustrated the planet gears will rotate at 20/10 or 2.0 times the rotational rate of the ring gear. Therefore, according to well known principles of planetary gearing the orbit gear will be rotated at a rate equal to the rate of the ring gear plus a fraction of that rate equal to $40/(2 \times 10)$ or $\frac{1}{2}$. In other words the orbit gear will now be rotated at 50% above the rotational rate of the ring gear. The effect of this in the driving of the rear axles 1 will be to accomplish a 50% increase in rotational rate of the axles for the same driving speed of the engine driven ring gear 11 and the speed of the vehicle, assuming a constant rotational rate of the ring gear 11, will be increased 50% over that speed provided when the clutch mechanism is in its alternate operative position.

Having thus described one embodiment of my invention I am aware that numerous and extensive departures may be made therefrom and that different gear ratios may be employed and the arrangement of the parts may be varied somewhat, but without departing from the spirit of my invention.

I claim:

1. In an axle system, in combination with a pair of oppositely extending final drive axles, a differential gear mechanism disposed at the inner ends of the axles, adapted to differentially communicate rotative movement to the axles, said mechanism including a differential pinion supporting spider, a ring gear for communicating rotary movement from the engine to the spider, and a set of substantially planetary gearing elements comprising orbit, sun, and planet gears interposed between said ring gear and said spider, the orbit gear being independently rotatably supported, means to communicate rotary movement of the said orbit gear to the spider to effect rotation of the spider with the orbit gear, an annular element fixedly secured to and rotating with said ring gear, stud shafts fixedly secured to said annular element, each rotatably supporting a planet gear, said planet gears being continuously in mesh with both said orbit and said sun gears, an axle housing for said axles including an enlarged intermediate portion for encasing said differential gear mechanism, said ring gear and said planetary gearing elements, and a manually operable clutch movable independently of the sun gear and adapted to be moved to alternate operative positions to alternately fixedly interlock said housing and sun gear, or, at the option of the operator, to fixedly interlock said sun gear and said annular element.

2. In an axle system, in combination with a pair of oppositely extending final drive axles, a differential gear mechanism disposed at the inner ends of the axles, adapted to differentially communicate rotative movement to the axles, said mechanism including a differential pinion supporting spider, a ring gear for communicating rotary movement from the engine to the spider, and a set of substantially planetary gearing elements comprising such orbit, sun, and planet gears interposed between said ring gear and said spider, means to communicate rotary movement of the said orbit gear to the spider to effect rotation of the spider with the orbit gear, an annular disc fixedly secured to and rotating with said ring gear, stud shafts fixedly secured to said disc, each rotatably supporting a planet gear, said planet gears being continuously in mesh with both said orbit and said sun gears, an axle housing for said axles including an enlarged intermediate portion for encasing said differential gear mechanism, said ring gear and said planetary gearing elements, and a manually operable clutch adapted to be moved to alternate operative positions to alternately fixedly interlock said housing and sun gear, or, at the option of the operator, to fixedly interlock said sun gear and said disc, said disc including a tubular hub disposed in telescoped relation over one of said axles, said sun gear including a longitudinally extending hub portion journalled on to said last named axle and through the first said hub, said first named hub terminating at its outer edge in clutch jaws, said clutch being in the form of a tube non-rotatably carried on an outwardly projecting portion of said second hub and adapted for longitudinal sliding movement thereon, an annulus rigidly carried by said axle housing and having clutch jaw teeth formed in an inwardly extending portion, said clutch being formed with jaw teeth adapted for alternate operative engagement with the jaw teeth of said first named hub and the jaw teeth of said annulus when longitudinally slid on said second hub to two different alternate positions.

3. In an axle system, the combination with a pair of oppositely extending final drive axles, a differential gear mechanism disposed at the inner ends of the axles and in driving relation thereto including a set of differential pinions and a supporting rotatable spider therefor, a ring gear adapted to communicate the driving effort of the engine to the differential mechanism through said spider, an axle housing having an enlarged intermediate portion encasing the said differential gear mechanism and said ring gear, a set of substantially planetary gearing elements comprising such orbit, planet and sun gears, said planet gears being continuously in mesh with said orbit and sun gears, a casing for said differential mechanism comprising a pair of annular end plates and a tubular casing element rigidly securing said end plates together, a stud shaft rigidly supported by one of said plates, said planet gear rotatably mounted on said stud shaft, means to communicate rotary movement of said orbit gear to said spider, comprising an annulus telescoped within said tubular casing elements and making radial bearing engagement therewith in longitudinally spaced portions of its outer surface, and means to interchangeably interlock said planet and sun gears or said housing and sun gear to effect variable driving ratios between said ring gear and said spider, said ring gear supported on said casing exteriorly thereof.

4. In a vehicle axle, the combination with an axle housing, a set of differential gears, driven axle sections extending laterally within the housing from opposing companion gears of said differential gear set, said differential gear set including a gear disposed intermediately of said opposing gears thereof and inter-meshed therewith, a revolvable spider rotatably supporting said intermediate gearing, driving means for said spider comprising a set of substantially planet gearings, a substantially orbit gear element thereof mounted to rotate with said spider to revolvably drive the same, a substantially planet gear, a revolvable support therefor upon which said planet gear is journaled, a substantially sun gear, and a clutch element movable independently of said sun gear, said sun gear being adapted to be interchangeably locked to said housing and to said planet gear support by movement of said clutch element.

5. In an axle driving mechanism for motor vehicles, in combination with a stationary housing, a driven ring gear, a pair of driven axle sections, a differential gear mechanism interposed between and differentially driving the said sections and including opposing gears associated with the sections and an intermediate gear meshed therewith, a planetary gearing disposed between the ring gear and said intermediate gear to bodily rotate the said intermediate gear, the planetary gearing including an orbit gear, a sun gear, and a planet gear meshed therewith, a rotary bearing support for the orbit gear whereby it may rotate relative to the ring gear, and a clutch element movable rotatably with the sun gear and axially relatively thereto for optionally locking the sun gear to the ring gear and to the casing.

6. In an axle driving mechanism for motor vehicles, in combination with a driving pinion, a pair of driven axle sections, a differential gear mechanism interposed between and differentially driving the sections, a set of substantially planetary gears disposed between said pinion and said differential gear mechanism to revolvably drive the intermediate gear element thereof, a substantially orbit gear of said planetary gears being mounted to rotate in unison with and to communicate driving motion to said intermediate differential gear, said planetary gears including also a plurality of planet gears and a mounting therefor upon which they are individually rotatably carried, said planet gears being loosely secured to said mounting to effect a limited bodily movement thereof.

7. In an axle driving mechanism for motor vehicles, a stationary frame, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, an orbit gear connected to the spider and rotatable therewith, a set of planet gears meshed with said orbit gear and disposed around the rotational axis of the spider, a ring gear rotatable on an axis substantially parallel to the said spider axis, the planet gears having a rotary bearing connection with the ring gear, a sun gear meshed with the planet gears and a clutch element keyed on the sun gear to rotate therewith and to move axially thereon to optionally lock the sun gear to the frame or to the orbit gear.

8. In an axle driving mechanism for motor vehicles, a pair of axle sections to be driven, a driving pinion, a driven gear meshed with the driving pinion and adapted to rotate on an axis substantially parallel to the axle sections, a differential gear mechanism interposed between and adapted to differentially drive the axle sections and means for transmitting power from said driven gear to said differential mechanism, said means including a plurality of planet gears having rotary bearing connection with the said driven gear, an orbit gear connected to the differential mechanism and meshed with the planet gears and a key-driven clutch element rotatable on an axis parallel to the axle sections and movable longitudinally of said axis and adapted when longitudinally moved to lock the planet gears and orbit gear against relative rotary movement.

9. In an axle driving mechanism for motor vehicles, a pair of driven axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, an orbit gear connected to the spider and rotatable therewith, a set of planet gears meshed with the orbit gear internally thereof and disposed around the rotational axis of the spider, a sun gear meshed with the planet gears internally thereof, a ring gear rotatable on an axis substantially parallel to the spider axis, the planet gears having a rotary bearing connection with the ring gear, a driving pinion meshed with the ring gear to drive it, an element axially movable independently of the sun gear for selectively connecting the sun gear with the ring gear to rotate in unison therewith or to lock it in fixed position against rotation.

10. In an axle driving mechanism for motor vehicles, a stationary frame, a pair of axle sections adapted to be driven, a differential gear mechanism interposed between the sections and adapted to differentially drive them, said differential gear mechanism including a gear on each axle section, an intermediate gear meshed with both of said gears and a spider rotatable on an axis substantially parallel to said axle sections and rotatably supporting said intermediate gear, an orbit gear connected to the spider and rotatable therewith, a planet gear meshed with the orbit gear, a sun gear meshed with the planet gear, a ring gear rotatable on an axis substantially parallel to the spider axis, the planet gear having rotary bearing connection with the ring gear and operable means for selectively connecting the sun gear with the ring gear in a manner to prevent relative rotation thereof or to lock the sun gear with the stationary frame to prevent rotation thereof.

11. In an axle driving mechanism for motor vehicles, a stationary frame, a pair of axle sections adapted to be driven, a differential gear mechanism interposed between the sections and adapted to differentially drive them, said differential gear mechanism including a gear on each axle section, an intermediate gear meshed with both of said gears and a spider rotatable on an axis substantially parallel to said axle sections and rotatably supporting said intermediate gear, an orbit gear connected to the spider and rotatable therewith, a planet gear meshed with the orbit gear, a sun gear meshed with the planet gear, a ring gear rotatable on an axis substantially parallel to the spider axis, the planet gear having rotary bearing connection with the ring gear, the orbit gear having rotary bearing support on an axis substantially parallel to the axle axis and rotatable thereon relative to the ring gear.

12. In an axle driving mechanism for motor vehicles, a stationary frame, a pair of axle sections adapted to be driven, a differential gear mechanism interposed between the sections and adapted to differentially drive them, said differential gear mechanism including a gear on each axle section, an intermediate gear meshed with both of said gears and a spider rotatable on an axis substantially parallel to said axle sections and rotatably supporting said intermediate gear, an orbit gear connected to the spider and rotatable therewith, a planet gear meshed with the orbit gear, a sun gear meshed with the planet gear, a ring gear rotatable on an axis substantially parallel to the spider axis, the planet gear having rotary bearing connection with the ring gear, and the orbit gear having rotary and end thrust bearing support providing for rotary movement around the said axis relative to the ring gear and substantially preventing movement longitudinally of the axis.

13. In an axle driving mechanism for motor vehicles, a stationary frame, a pair of axle sections adapted to be driven, a differential gear mechanism interposed between the sections and adapted to differentially drive them, said differential gear mechanism including a gear on each axle section, an intermediate gear meshed with both of said gears and a spider rotatable on an axis substantially parallel to said axle sections and rotatably supporting said intermediate gear, an orbit gear connected to the spider and rotatable therewith, a planet gear meshed with the orbit gear, a sun gear meshed with the planet gear, a ring gear rotatable on an axis substantially parallel to the spider axis, the planet gear having rotary bearing connection with the ring gear, and operable means movable into connection with the ring gear for selectively connecting the ring gear with the sun gear in a manner to prevent relative rotation thereof or to connect the sun gear with the stationary frame to prevent rotation thereof.

14. In an axle driving mechanism for motor vehicles, a pair of driven axle sections adapted to be driven, a differential gear mechanism interposed between and adapted to differentially drive the sections including a gear on each axle section, an intermediate gear meshed with both of said gears and a spider rotatable on an axis substantially parallel to said axle sections and rotatably supporting said intermediate gear, an individually rotatably mounted orbit gear connected to the spider and rotatable therewith, a set of planet gears meshed with the orbit gear internally thereof and disposed around the rotational axis of the spider, a sun gear disposed within the orbit gears and meshed therewith, a rotary element adapted to be driven by the vehicle engine, the planet gears having rotary bearing connection with the rotary element and operable means for selectively connecting the sun gear with the rotary element to substantially prevent relative rotary movement therebetween or to lock it in substantially fixed position against rotation.

In testimony whereof I hereunto affix my signature this 23rd day of April, 1929.

ARTHUR A. WIEDMAIER.